US008631429B2

(12) United States Patent
Yu

(10) Patent No.: US 8,631,429 B2
(45) Date of Patent: Jan. 14, 2014

(54) APPARATUS AND METHOD FOR MANAGING PROGRAMS IN A DIGITAL TELEVISION

(75) Inventor: Tsan Cheng Yu, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 714 days.

(21) Appl. No.: 12/371,125

(22) Filed: Feb. 13, 2009

(65) Prior Publication Data

US 2009/0210893 A1 Aug. 20, 2009

(30) Foreign Application Priority Data

Feb. 19, 2008 (TW) .............................. 97105804 A

(51) Int. Cl.
*H04N 7/16* (2011.01)
(52) U.S. Cl.
USPC .................. 725/28; 725/25; 725/38; 725/46; 725/61
(58) Field of Classification Search
USPC .................................. 725/28, 25, 38, 46, 61
See application file for complete search history.

(56) References Cited

U.S. PATENT DOCUMENTS

| 7,836,465 | B2 * | 11/2010 | Mori et al. ...................... 725/28 |
| 2003/0097657 | A1 * | 5/2003 | Zhou et al. ..................... 725/46 |
| 2007/0180462 | A1 * | 8/2007 | Shin et al. ...................... 725/28 |
| 2007/0204304 | A1 | 8/2007 | Kim |
| 2007/0214472 | A1 | 9/2007 | Kim et al. |
| 2008/0141295 | A1 * | 6/2008 | Kinoshita et al. ............... 725/28 |

FOREIGN PATENT DOCUMENTS

KR 20060097330 A 9/2006

OTHER PUBLICATIONS

Taiwan Office Action dated Apr. 30, 2013, 7 pages.

* cited by examiner

*Primary Examiner* — Jivka Rabovianski
(74) *Attorney, Agent, or Firm* — Edell, Shapiro & Finnan, LLC

(57) ABSTRACT

The invention provides a program managing method for use in a digital television for managing programs by rating region tables (RRTs). The method includes receiving a channel switch signal; switching to a channel according to the channel switch signal; searching whether a local rating region table (RRT) of the channel is stored in the digital television; and playing programs according to the contents of the local rating region table when the local rating region table is stored in the digital television, else creating the local rating region table in the digital television and playing programs according to the contents of the local rating region table.

11 Claims, 7 Drawing Sheets

|   | ALL | FV | V | S | L | D |
|---|---|---|---|---|---|---|
| TV-Y |  |  |  |  |  |  |
| TV-Y7 |  |  |  |  |  |  |
| TV-G |  |  |  |  |  |  |
| TV-PG |  |  |  |  |  |  |
| TV-14 |  |  |  |  |  |  |
| TV-MA |  |  |  |  |  |  |

FIG.1
(prior art)

|   | R1 | R2 | R3 |
|---|---|---|---|
| D1 | ○ | ○ |  |
| D2 |  | ○ | ○ |
| D3 | ○ |  |  |

FIG.2(a)

|   | R4 | R5 | R6 | R7 |
|---|---|---|---|---|
| D4 | ○ |  |  |  |
| D5 | ○ | ○ | ○ |  |
| D6 | ○ | ○ |  |  |
| D7 |  |  |  | ○ |

FIG.2(b)

|    | R1 | R2 | R3 |
|----|----|----|----|
| D1 |    |    |    |
| D2 |    |    |    |
| D3 |    |    |    |

|    | R1 | R2 | R3 |
|----|----|----|----|
| D1 | ○  | ○  |    |
| D2 |    | ○  | ○  |
| D3 | ○  |    |    |

|    | R4 | R5 | R6 | R7 |
|----|----|----|----|----|
| D4 |    |    |    |    |
| D5 |    |    |    |    |
| D6 |    |    |    |    |
| D7 |    |    |    |    |

APPARATUS AND METHOD FOR MANAGING PROGRAMS IN A DIGITAL TELEVISION

FIELD OF THE INVENTION

The present invention relates to a digital television and a method for managing digital television programs. More particularly, the present invention relates to a digital television capable of storing and correspondingly setting a downloadable rating region table (RRT), and a method for using the same.

BACKGROUND OF THE INVENTION

To ensure best interest of mental and physical health for teenagers and children, and to give consideration to viewing privileges of audiences in various age groups, as well as to provide appropriate space for creation and development of the television production industry, countries and organizations worldwide rate movies and television programs based on contents therein into various categories. In the United States, Motion Picture Association of America (MPAA) divides movies and television programs into ratings on basis of age. To a certain extent, a purpose of offering programs containing specific aspects and contents suitable for certain age groups is satisfied.

Before being launched or played in a country or a region, movies and television programs need to be previewed and rated accordingly by responsible organizations as described above. In terms of movie control, audiences that do not fulfill age restrictions or regulations of certain ratings are not allowed to watch a movie intended to watch. In terms of television programs, it is mandatory that channel providers play appropriate channels or programs at corresponding time slots, or to block specific channels or programs from subscribers without proper identification verifications. Evaluation criteria of ratings are based on explicit sexual content, graphic violence and strong profanity, or other suggestive or even substantial dialogues that are upsetting to mental and physical conditions of audiences of certain age groups. Thus, based on degrees of disclosure of the foregoing factors, responsible organizations determine which ratings of certain movies or programs should be given.

In a digital era as today, processing techniques of digital televisions or digital signals have progressed significantly. Compared to conventional analog television signals, digital television signals contain much more added information, giving digital televisions a wider application range. Digital television signals of cable television or broadcasting television programs are transmitted to a digital television at a user's end. During the transmission, application information, interactive information, or more diversified signals be added to data transport streams of the digital television signals by way of signal compression and encoding according to the user's demands. Information of such is a type of service information for providing descriptions or manipulation for signal transmission and reception.

Therefore, the service information is added into data transport streams of digital television programs containing the aforementioned rating and attribute information, so as to generate a rating region table (RRT) for determining broadcast settings as required. Currently in the United States, the RRT is defined by the Advanced Television Systems Committee (ATSC). Criteria for rating television programs, apart from age groups, contents of the programs are mainly taken into consideration. Contents are classified into attributes of violence (V), sexual situations (S), coarse or crude indecent language (L), suggestive dialogue (D), and fantasy violence (FV). Based on the attributes, an administrator at the user end is facilitated to set up a viewing scheme via a parental rating function menu of the digital television.

FIG. 1 shows a setting table of an RRT. The RRT can be displayed as a menu using an on-screen display (OSD). An administrator, via a user interface, e.g., a remote control, sets up a viewing scheme. As shown in the diagram, the vertical items represent age groups including TV-V (all children) to TV-MA (17+ only), whereas the horizontal items represent the attributes including FV, V, S, L and D. An administrator sets programs or movies to be viewable or to be blocked based on specific ratings or content attributes through the menu. When receiving signals of programs or movies of the specific ratings or attributes, whether the programs or movies can be viewed or blocked is then determined by information in the data transport streams corresponding to ratings or attributes representing the contents. Further, a password is used in conjunction with the menu.

In other words, applications of current digital television programs are much more sophisticated rather than achieving simple settings such as blocking or permitting display of all programs of a specific channel. Preferably, a user freely configures settings to block or permit display of particular programs at different time slots, or programs or movies of specific ratings or attributes with respect to a same channel or different channels, giving a more personalized and flexible viewing scheme for digital television programs.

The above television rating system based on age groups and content attributes is defined by the ATSC. That is, associated conditions and contents, as well as the number of options on the menu are unchangeable, and definitions and categories of such menu not fully satisfy contents of certain programs so to be appropriately viewed by audiences. Therefore, precisely speaking, definitions and conditions provided by the aforesaid menu appear rather inadequate.

Take an entertainment program for example. An entertainment program is meant to entertain audiences of all age groups, and then have an attribute of general audience. However, contents of certain entertainment programs contain suggestive humor or coarse language, which evoke uneasiness when viewed by audiences of specific age groups such as elderly persons. Or, certain programs rated for general audiences contain excitement and thrills of various degrees, which are somewhat hard to be exactly classified using the foregoing content attributes defined by the ATSC. Further, certain programs involve melancholy implications that cause mental discomfort or negative influences when viewed by audiences other than mature audiences.

Therefore, in the United States, a mechanism for a downloadable rating region table (RRT) of digital televisions using RRT technology has been developed. Television channel providers are guided to classify and define programs to be broadcasted according to content attributes of the programs. With reference to a downloaded RRT contained in a data transport stream of corresponding digital televisions, a user at the user's end is facilitated to set whether the programs can be viewed or blocked as desired. RRTs of the digital television program are defined by channel service providers according to different channels or programs, and are transmitted to digital televisions in users' households using corresponding channels. Each RRT contains distinct definitions and dimensions, and is identified using various identification information. Note that channel service providers designate different or same identification information to RRTs of different programs of a same channel.

FIG. 2(a) shows a table of setting a first RRT 1 transmitted by a digital television program of a first channel. In the table, the vertical options represent the foregoing content attributes including entertaining, sexual and thrilling characteristics, and three attributes or dimensions from D1 to D3 are defined. The horizontal options represent degrees or ratings of corresponding attributes, such as mild, moderate and strong, and three degrees or ratings from R1 to R3 are shown in this diagram. Circles in the table indicate blocking is set against users.

FIG. 2(b) shows a table of setting a second RRT 2 transmitted by a digital television program of a second channel, and is similar to FIG. 2(a) showing the first RRT 1. Differences between the two tables are that, in the second RRT 2 in FIG. 2(b), vertical options define four attributes from D4 to D7, while horizontal options define four degrees or ratings from R4 to R7 corresponding to the attributes. Since users have various definitions for different channels or different programs, the attributes and ratings defined in the RRT 2 overlap with or are completely different from those defined in the RRT 1, so that blockage settings set by users in the two RTTs are unrelated.

In applications of the downloadable digital television RRT mechanism using current digital television technologies, a flash memory or an electrically erasable programmable read-only memory (EEPROM) adopted in a digital television system is capable of storing only one set of program setting information. In other words, when the user switches channels such as switching from the aforesaid first channel to the second channel, settings made in the first RRT 1 of the first channel are deleted, and resetting is then necessary when switching back to the first channel.

In addition, when the user switches from the first channel to the second channel, the current digital television technologies directly apply settings in the first RRT 1 to the second RRT 2 without any adaptation. That is, a subsequent RRT inherits definitions of a previous RRT. However, as in the foregoing discussion, definitions for attributes and contents for two different RRTs are completely dissimilar, and blockage settings programmed by users are totally unrelated, on top of that direct applications of RTTs having different options or dimensions are not always suitable on one another. As a result, serious operating complications are incurred when the user views programs of certain channels and programs associated settings.

SUMMARY OF THE INVENTION

A primary object of the invention is to provide an apparatus for storing and correspondingly setting various downloadable rating region tables (RRTs) of different digital television programs, and a method for the same. Using the apparatus and method according to the invention, complications and inconveniences caused by repeated resetting compelled by operations switching between channels, as well as unintended blocking or permitting display of certain channel/programs resulted from RRTs being mistakenly defined, are avoided.

The invention provides a program managing method using in a digital television for managing programs by rating region tables (RRTs), the method comprising steps of: receiving a channel switch signal; switching to a channel according to the channel switch signal; searching whether a local rating region table (RRT) of the channel is stored in the digital television; and playing programs according to the contents of the local rating region table when the local rating region table is stored in the digital television, else creating the local rating region table in digital television and playing programs according to the contents of the local rating region table.

The invention further provides an apparatus using in a digital television for managing programs by rating region tables (RRTs), the apparatus comprising a memory unit, for storing a plurality of local rating region tables; a user instruction receiving unit, for receiving a setting signal from a user for setting the local rating region tables; a digital television receiving unit, for receiving the plurality of remote rating region tables from a service provider; and a channel information processing unit, for setting the local rating region tables according to one of the setting signal and the remote rating region tables.

BRIEF DESCRIPTION OF THE DRAWINGS

The present invention will become more readily apparent to those ordinarily skilled in the art after reviewing the following detailed description and accompanying drawings, in which:

FIG. 1 is a table of setting a digital television rating region table (RRT).

FIG. 2(a) is a table of a user setting a first RRT 1 transmitted by a digital television program of a first channel.

FIG. 2(b) is a table of a user setting a second RRT 2 transmitted by a digital television program of a second channel.

FIGS. 5(a) and 5(b) are tables of a first RRT A before and after being programmed, respectively.

FIGS. 5(c) and 5(d) are tables of a second RRT B before and after being programmed, respectively.

DETAILED DESCRIPTION OF THE PREFERRED EMBODIMENT

Conventional digital televisions are incapable of storing multiple downloadable rating region tables (RRTs) and corresponding setting information adapted for various channel/programs. Further, according to the prior art, settings of an RRT of a particular channel/program having different contents and definitions from those of a next channel/program to be switched to, are directly applied to the next channel/program to without any adaptation when switched to the next channel/program. In view of the foregoing drawbacks of the prior art, the invention provides an apparatus and a method for use in current digital televisions so as to overcome the operating complications.

Figure 3:
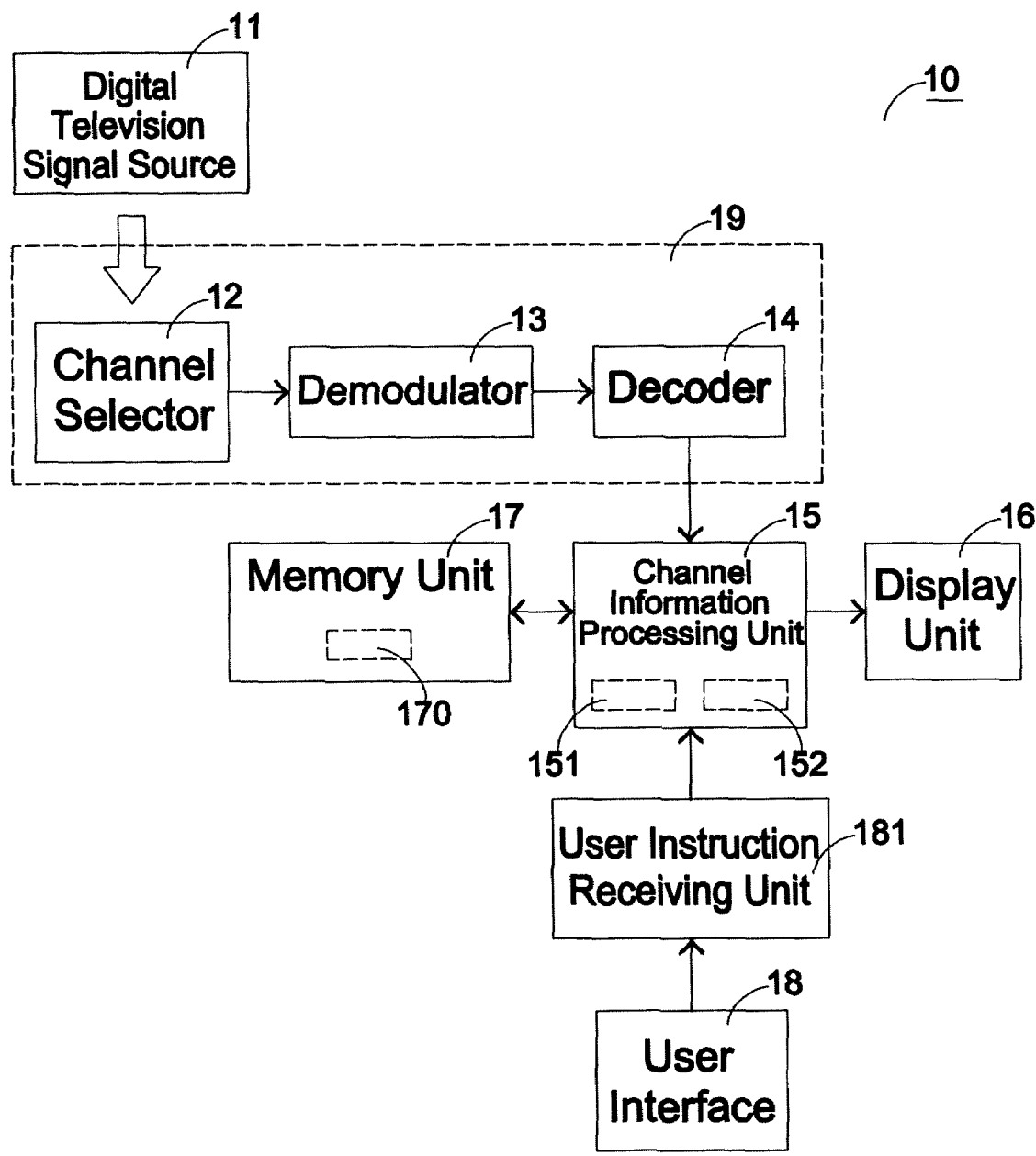
FIG. 3 is a functional block diagram of a digital television 10.

FIG. 3 shows a functional block diagram of a digital television 10 used in the method according to the invention. Using a digital television receiving unit 19, the digital television 10 receives television signals transmitted from a digital television signal source 11 at a channel/program service provider end. The digital television receiving unit 19 comprises a channel selector 12, a demodulator 13 and a decoder 14. The digital television receiving unit 19 processes the received signals and transmits the processed signals to a channel information processing unit 15, accesses channel/program information in the signals, and transmits video/audio information to a display unit 16 for display. The digital television signals are received by the digital television 10 by way of a data transport stream. In the data transport stream, added channel information or program information, or settings associated with the channel information and programmed by the user, are stored to a memory unit 17. The memory unit 17 may be a dynamic random access memory (DRAM), a flash memory, and/or an electrically erasable programmable read-only memory (EEPROM). A user interface 18, which is a remote control, or an operation panel located outside of the digital television 10, facilitates the user to send out a user instruction so as to complete associated operations or controls. A user instruction receiving unit 181 is signally connected between the channel information processing unit 15 and the user interface 18 so as to receive instruction signals from the channel information processing unit 15.

As noted in the discussion on the prior art, RRTs of different channels and programs broadcasted by channel service providers are not capable of identifying differences in the RRTs. Thus, complications of repeated resetting compelled by switching operations between channels, as well as unintended blocking or permitting display of certain channel/programs resulted from RRTs being mistakenly defined, are incurred.

To solve the above issues, a database 170 is first established in the digital television 10 according to the invention, and is provided in the memory unit 17. Under control of the channel information processing unit 15, the database 170 stores multiple RRTs, which are contained in the received data transport streams and represent different programs or different programs on various channels. The user is then facilitated to complete corresponding settings based on the stored RRTs, so as to correctly block or permit display of different programs as desired using a diversity of setting information. Further, using a managing method according to the invention, the digital television 10 shall operate according to RRTs specified by the user when switching channels, changing programs or updating versions of the RRTs. Detailed steps of the method are to be illustrated below, wherein associated control and processing are completed using the channel information processing unit 15.

Figure 4:
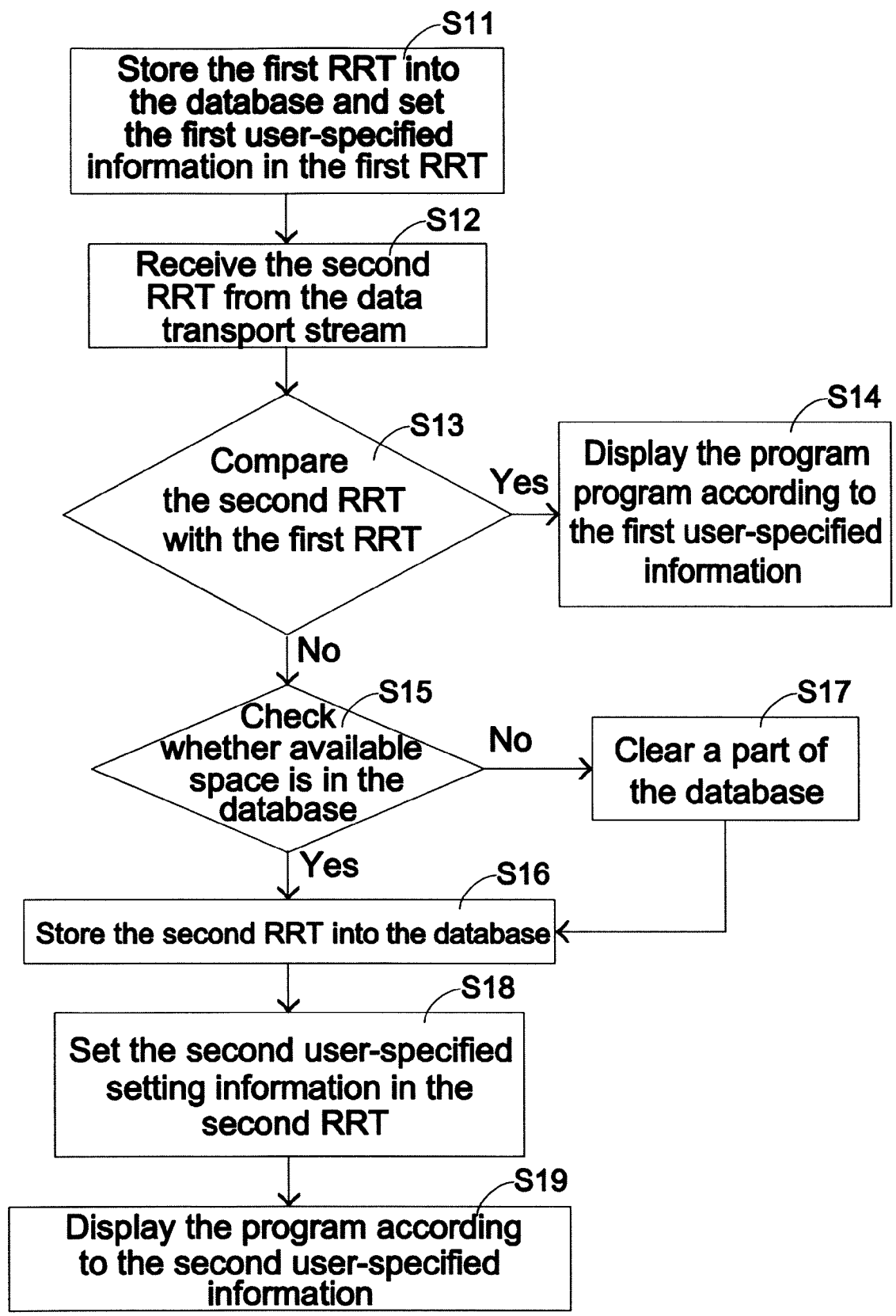
FIG. 4 is a flowchart according to a first preferred embodiment of the invention.

FIG. 4 shows a flowchart of a method according to a first embodiment of the invention. Also referring to FIGS. 5(*a*) to 5(*d*), FIGS. 5(*a*) and 5(*b*) are schematic diagrams of a first RRT A of a digital television program on a first channel before and after being programmed, respectively; similarly, FIGS. 5(*c*) and 5(*d*) are schematic diagrams of a second RRT B of a digital television program on a second channel before and after being programmed, respectively. In the first embodiment, contents of FIGS. 5(*a*) to 5(*d*) are related to those illustrated in FIGS. 2(*a*) and 2(*b*).

Figure 5D:
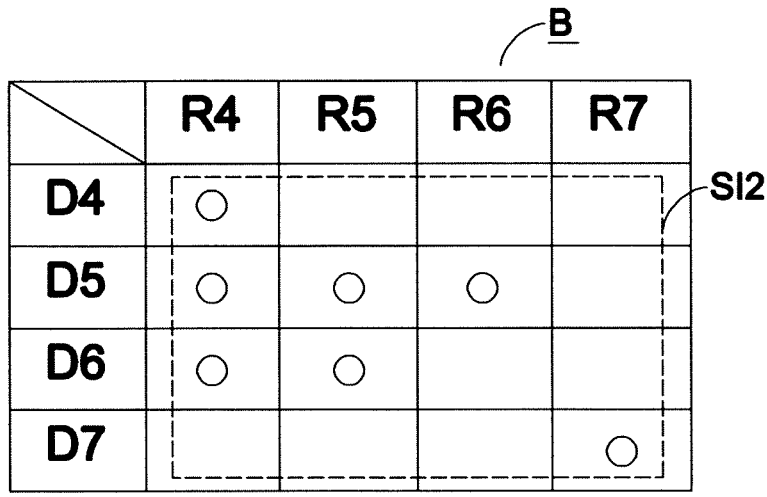

According to the first embodiment, in Step S11, the first RRT A before being programmed, and transmitted from the first channel, is stored into the database 170 as shown in FIG. 5(*a*). The RRT A is a type of channel/program information of the first channel in the data transport stream received by the digital television 10, and is a specific RRT corresponding to a current program on the first channel. As shown in FIG. 5(*a*), the first RRT A has three attributes or dimensions from D1 to D3, and definitions of three degrees or rating values from R1 to R3 corresponding to each attribute or dimension. For example, the current corresponding program on the first channel is defined to have three content attributes of tension, excitement and terror (D1 to D3), and three degrees or rating values of mild, moderate and strong (R1 to R3).

As described above, initially the first RRT A is a blank table that is not programmed yet. When sending out the first RRT A, information of classified attributes and degrees in the table corresponding to the current program on the first channel is jointly received in the data transport stream. For instance, the current program on the first channel is classified into categories of "moderate tension", "strong excitement", and "mild thrill". When an administrator at the user end wishes to manage the program in the above categories for audiences in the household, the administrator program management settings on the first RRT A in the database 170 through the user interface 18. Referring to FIG. 5(*b*), when the user instruction receiving unit 181 receives a corresponding setting signal, operating contents of the first RRT A of the first channel be programmed according to the setting signal, so as to produce the first RRT A having first user-specified setting information SI1 to be stored into the database 170. Using the user interface 18, audiences are allowed to modify the first RRT A anytime as desired, and then to store latest updated setting information into the database 170.

In this embodiment, the user specifies the setting information SI1 to "moderate tension", "strong excitement", and "mild thrill". Suppose the user programs the degree to mild only, degrees of moderate and strong are blocked as well. In other words, in this embodiment, "moderate tension", "strong excitement", and "mild thrill" are all blocked. Hence, when the user blocks programs of lower degrees or ratings, programs of higher degrees or ratings are also blocked.

Therefore, in continuation of the above RRT and corresponding user setting information, when any of the attributes and degrees of contents represented by the data transport stream which is also program signals received, equals to or is higher than those in the user-specified information, the program is blocked. On the contrary, when all the attributes and degrees are lower than those in the user-specified information, the program is permitted for display.

Moreover, in this embodiment, the first RRT A stored in the database 170 is applied to all programs having the same identification information in all channels, so as to determine whether to block or permit display corresponding programs based on the first user-specified information SI1 in response to attributes and degrees of content information of different programs. Therefore, in this embodiment, various RRTs transmitted from numerous channel service providers and corresponding settings programmed by users or administrators at the user's end are organized and stored into the database 170, and serve as basis for whether to block or permit display of different programs on various channels in the future. Steps for comparing, checking or searching, loading or other advanced settings for the RRT shall be illustrated as follows.

According to the embodiment, in Step S12, a second RRT B before being programmed, as shown in FIG. 5(*c*), is similarly transmitted from a second channel and received. The second RRT B is a type of channel/program information of the second channel in the data transport stream received, and represents an RRT of a current corresponding program on the second channel. As shown in FIG. 5(*c*), the second RRT B has four content attributes or dimensions from D4 to D7, and four degrees or rating values from R4 to R7 corresponding to the defined attributes or dimensions, respectively.

According to current technologies, the downloadable RRTs are continually dispatched in the data transport stream along with the programs. A particular RRT is designated with particular identification information, which includes identification name and version. For an RRT with a same identification name but having modified definitions or updated versions, namely, partial attributes or partial degrees are added or deleted, different versions are given to note the differences.

Therefore, in Step S13 according to this embodiment, such feature is used for comparison and judgment to determine which RRT represents a program channel being viewed, and whether associated information is stored in the database 170, so as to correspondingly permit or block display upon switching between programs by the user. Further, in this embodiment, an RRT management unit in the channel information processing unit 15 is used for performing such checking, judgment, and comparison.

In this embodiment, the first RRT A and the second RRT B are designed as different tables, or only the first RRT A but not the second RRT B is stored in the database 170. Hence, the second RRT B shall be stored and received by the viewer for further setting. Or, suppose the RRTs compared in Step S13 are stored into the database 170, operations are proceeded based on the stored RRTs and corresponding user-specified settings, so as to permit or block display the program intended according to the first user-specified information SI1 in this embodiment, for example, as in Step S14.

In Step S15 of storing and further setting the second RRT B according to this embodiment, storage space of the database 170 is first checked. In Step S16, when storage space is available in the database 170, the second RRT B is stored into the database 170. In Step S17, when storage space in unavailable in the database 170, the database 170 is appropriately cleared to provide required storage space for storing the second RRT B. In this embodiment, a memory management unit 152 in the channel information processing unit 15 is used for such storing, updating and clearing for adequate storage space tasks.

Figure 6:
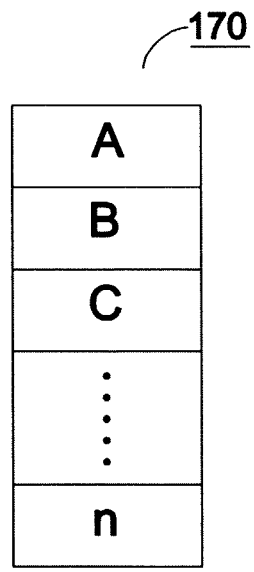
FIG. 6 is a format of a database 170.

FIG. 6 shows a format of the database 170 according to this preferred embodiment. For that a system memory including DRAM, flash memory and EEPROM adopted in a common digital television has a certain storage capacity, the system memory is only entitled to store a limited amount of corresponding data although definitions of program RRTs are becoming more and more diverse. Referring to FIG. 6, the database 170 stores n RRTs and corresponding user-specified setting information, where n is dependent on capacity of a space that a user or a manufacturer assigns to the memory 17 for storing the database 170. However, according to this embodiment, the memory 17 only is provided in a flash memory or a read-only memory which is capable of maintaining integrity of stored data in case of powering off.

In Step S17, when storage space is unavailable in the database 170, an oldest RRT stored in the database 170, e.g., the n-th RRT in FIG. 6, and corresponding user-specified setting information, are deleted; or, depending on a size of the second RRT B to be stored, oldest and second oldest RRTs and corresponding user-specified setting information are deleted, so as to store a latest RRT received. Alternatively, the foregoing deleting process is implemented by randomly deleting any target. That is, any RRT stored in the database 170 is selected and deleted, and updated information is then stored in the cleared space.

In Step S18, a user or an administrator at the user end programs the second RRT B using the user interface 18 to provide a second RRT B having second user-specified setting information SI2, with the programmed second RRT B stored into the database 170.

In the second RRT B, the four attributes or dimensions from D4 to D7, and the four degrees or rating values from R4 to R7, include definitions of D1 to D3 and R1 to R3 in the first RRT A, or are completely different definitions, or include all definitions in the first RRT A but the definitions are listed in a different sequence. For instance, definitions of the four attributes or dimensions are sorrow, tension, excitement and terror, and definitions of the four degrees or rating values are mild, moderate, strong and very strong. Associated applications of permitting or blocking display of received channel/programs based on the stored second RRT B with the second user-specified setting information SI2 are identical to those previously described in this embodiment.

In last Step S19 in this embodiment, the program is blocked or allowed for display according to contents of the second RRT B, which also is applied to all programs of all channels having same identification information. Thus, in response to attributes and degrees of all sorts of programs, corresponding programs are blocked or permitted for display according to the second user-specified setting information SI2 in a uniform manner.

Figure 7:
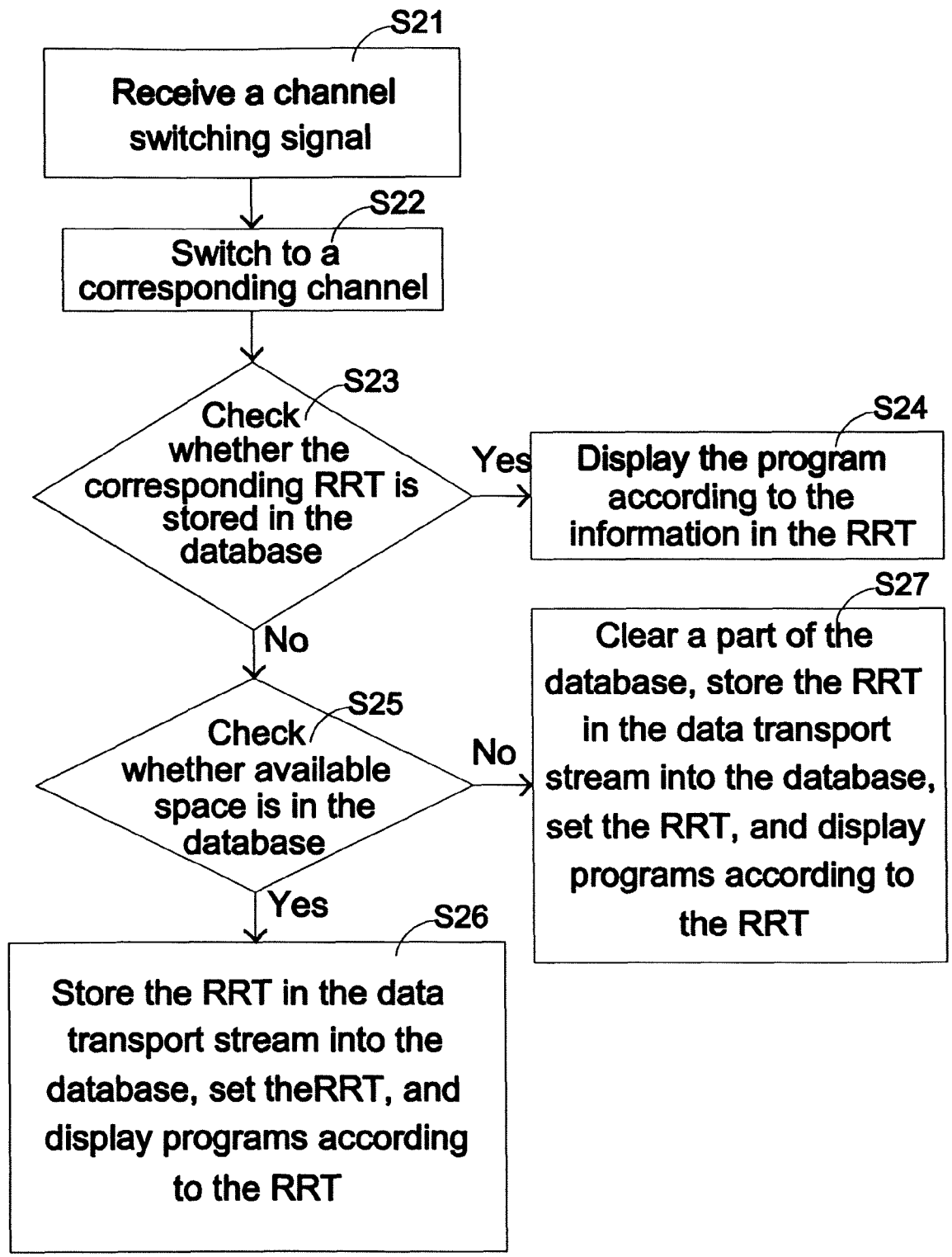
FIG. 7 is a flowchart according to a second preferred embodiment of the invention.

FIG. 7 shows a flowchart according to a second preferred embodiment of the invention. In this embodiment, operations of program viewing and channel switching by the user shall be illustrated. Associated hardware application units are the same as those in the first preferred embodiment, and shall not be unnecessarily further described.

Referring to FIG. 7, the user switches channels by manipulating the user interface 50, such as a remote control or an operation panel. In Step S21 and Step S22, the digital television 10 receives a channel switching signal produced, and switches to a corresponding channel. At this point, in Step S23, the channel information processing unit 15 in the digital television 10 checks an RRT transmitted correspondingly to the channel; that is, the channel information processing unit 15 checks whether the same RRT is stored in the database 170 in the memory unit 17. In Step S24, when the same RRT is stored in the database 170, operations are proceeded according to corresponding contents stored in the database 170; that is, the channel information processing unit 15 displays programs according to the information of the RRT. In Step S25, when the RRT is not stored in the database 170, the channel information processing unit 15 first checks whether storage space is available in the database 170 in the memory unit 17. In Step S26, when storage space is available in the database 170, the RRT in the data transport stream transmitted from the channel is stored into the database 170 to proceed with required settings, followed by performing management operations according to the RRT programmed with desired settings; that is, the channel information processing unit 15 displays programs according to the information of the RRT. In Step S27, when storage space is unavailable in the database 170, the database 170 is appropriately deleted, namely, an oldest record or any previously stored RRT is deleted, to store the RRT of the channel into the database 170 to further proceed with required settings, followed by performing management operations according to the RRT programmed with desired settings; that is, the channel information processing unit 15 displays programs according to the information of the RRT.

Figure 8:
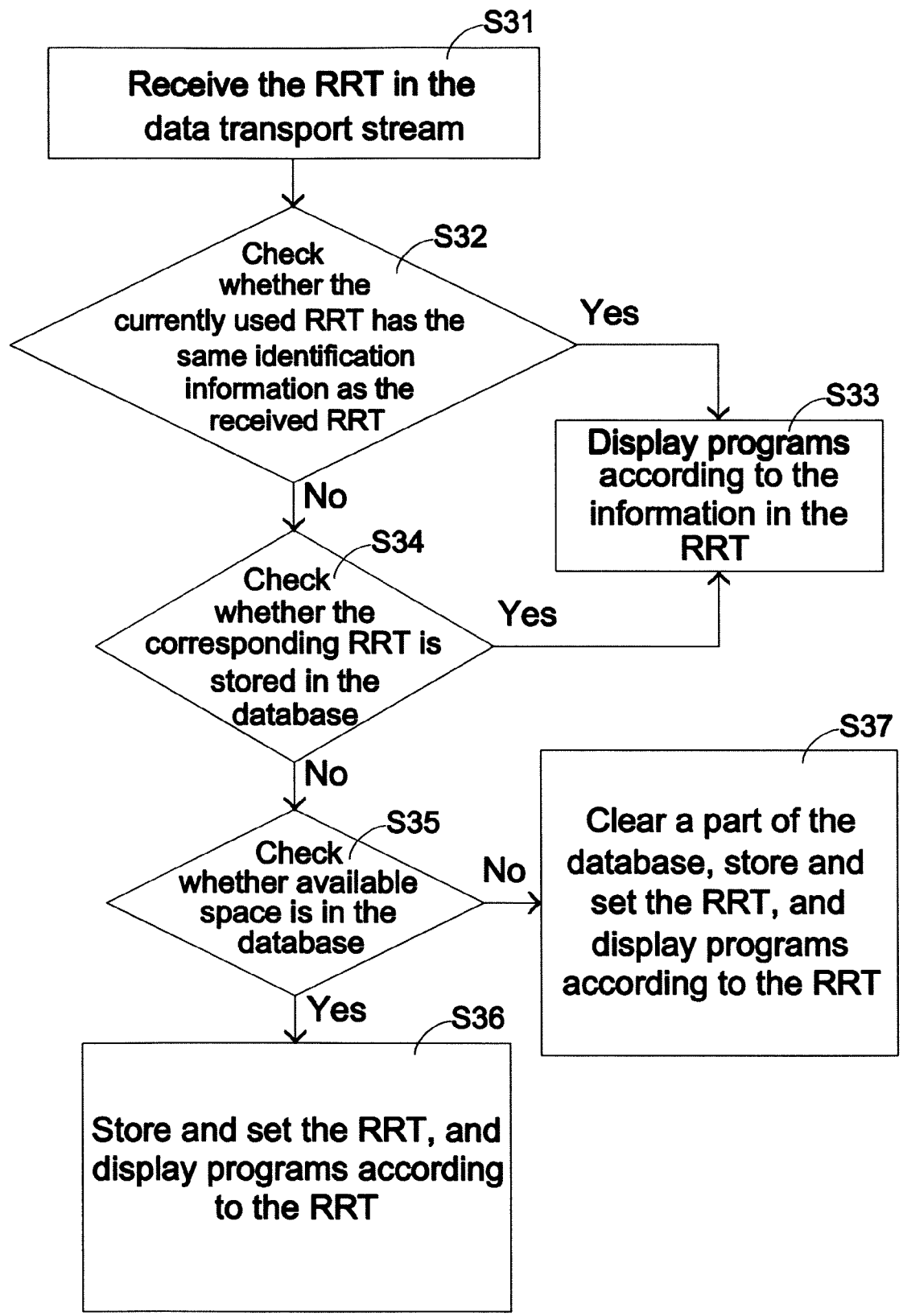
FIG. 8 is a flowchart according to a third preferred embodiment of the invention.

FIG. 8 shows a flowchart according to a third preferred embodiment of the invention. In this embodiment, operations of storage and update of the digital television 10 based on identification information, including name and version, contained in an RRT in data transport stream of a channel shall be illustrated. Associated hardware application units are the same as those in the first preferred embodiment, and shall not be unnecessarily further described.

Referring to FIG. 8, in Step S31, the digital television 10 receives the RRT in the data transport stream of a channel. In Step S32, the channel information processing unit 15 in the digital television 10 checks the RRT, more particularly, checks whether the currently used RRT for managing a currently displayed channel has the same identification information as the RRT received. In Step S32, when the two RRTs contain the same identification information, the RRT currently used by the currently displayed channel is used for management. In Step S33, when the two RRTs contain different identification information, the database 170 in the memory unit 17 is checked to see whether the same RRT is stored in the database 170. Step S34 is performed in the event that the same RRT is stored; that is, the channel information processing unit 15 displays programs according to the information of the RRT. In Step S35, when the same RRT is not stored in the database 170, the channel information processing unit 15 checks whether storage space is available in the database 170 in the memory unit 17. In Step S36, when storage space is available, the RRT in the data transport stream from the channel is received and stored into the database 170 to proceed with required settings, followed by performing management operations according to the RRT programmed with desired settings; that is, the channel information processing unit 15 displays programs according to the information of the RRT. In Step S37, when storage space is unavailable in the database 170, the database 170 is appropriately deleted, namely, an oldest record or any previously stored RRT is deleted, to store the RRT of the channel into the database 170 to further proceed with required settings, followed by performing management operations according to the RRT programmed with desired settings; that is, the channel information processing unit 15 displays programs according to the information of the RRT.

By implementing the method and the apparatus of the aforesaid embodiments, corresponding settings of different RRTs of various programs are stored to effectively carry out required management. Therefore, complications and inconveniences caused by repeated resetting compelled by switching between channels, as well as unintended blocking or permitting display of certain channel/programs resulted from RRTs being mistakenly defined, are avoided, thereby accomplishing the primary object of the invention.

According to current technologies, the RRT in the data transport stream received by the digital television 10 is continually transmitted at a predetermined time interval of approximately tens of seconds within in a time slot of corresponding program signals. Therefore, while the user switches channels, the system is mandated to wait for the predetermined time interval to receive information of the RRT, which then facilitates further comparison, checking, searching, setting or storage operations in order to perform associated operations of corresponding settings, thus potentially resulting in a dead time.

In view of the above drawback, improvements are achieved by modifying concepts and embodiments according to the invention, or by combining with the prior art. For example, a length of the predetermined time interval is shortened so as to reduce the dead time, or, definitions of the RRT and corresponding user-specified setting information of a previous channel/program are inherited for reference during a transition period of the dead time. Alternatively, information required by the database 170 is collected and stored as complete as possible, and a current electronic programming guide (EPG) received by the digital television is taken into reference, such that when the user switches programs, the user is allowed to allocate a current corresponding program on the EPG, and find information of the RRT that be already stored from the database 170. After receiving the latest information, concepts and embodiments according to the invention are used provide solutions to the above drawback.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A program managing method for use in a digital television, the method comprising steps of:
receiving a channel switch signal;
switching to a channel according to the channel switch signal;
searching, a memory unit comprising a plurality of local rating region tables (RRTs) each corresponding to one of a plurality of channels, to determine whether a local rating region table corresponding to the channel is stored in a memory unit of the digital television; and
playing programs of the channel according to a contents of the local rating region table when the local rating region table is stored in the memory unit of the digital television,
if the local rating region table is not stored in the memory unit checking whether storage space is available in the memory unit of the digital television, and
storing a remote rating region table of the channel into the memory unit of the digital television when storage space is available in the memory unit of the digital television, when the storage space is not available deleting at least one local rating region table of other channel and storing the remote rating region table of the channel into the memory unit of the digital television.

2. The program managing method as claimed in claim 1, further comprising steps of:
receiving a user setting signal including information for updating the local rating region table; and
setting the contents of the local rating region table according to the user setting signal.

3. The program managing method as claimed in claim 1, further comprising steps of:
receiving the remote rating region table of the channel in the data transport stream from a service provider end; and
updating the contents of the local rating region table according to the contents of the remote rating region table.

4. The program managing method as claimed in claim 1, wherein one of the local rating region table and the remote rating region table comprises at least one attribute dimension and a plurality of rating values corresponding to the attribute dimension for managing program settings of blocking or permitting display according to the rating values corresponding to the at least one attribute dimension in the one of the rating region tables.

5. An apparatus for managing programs for use in a digital television, the apparatus comprising:
a memory unit comprising a plurality of local rating region tables (RRTs) each corresponding to one of a plurality of channels;
a user instruction receiving unit, for receiving a setting signal from a user for setting the local rating region tables;
a digital television receiving unit, for receiving a plurality of remote rating region tables from a service provider; and
a channel information processing unit, for setting the local rating region tables according to one of the setting signal and the remote rating region tables, wherein, in response to the receipt of a channel switch signal, the channel information processing unit is configured to switch to a first channel identified by the channel switch signal, search the memory unit to determine whether a first local rating region table of the first channel is stored in the memory unit, and play programs according to a contents of the first local rating region table when the first local rating region table is stored in the memory unit;

a table searching unit, for checking whether the remote rating region tables are stored in the memory unit, and a setting unit, for storing the remote rating region tables into the memory unit when the remote rating region tables are not stored in the memory unit, wherein the setting unit is configured to delete at least one oldest rating region table stored in the memory unit when storage space of the memory unit is full.

6. The apparatus as claimed in claim 5, wherein the channel information processing unit further comprises:

a table management unit, for checking versions of the local rating region tables stored in the memory unit with the corresponding remote region tables; and a setting unit, for updating the local rating region tables when the versions of the local rating region table are older than the versions of the remote rating region tables.

7. The apparatus as claimed in claim 5, wherein one of the local rating region table and the remote rating region table comprises at least one attribute dimension and a plurality of rating values corresponding to the attribute dimension for managing program settings of blocking or permitting display according to the rating values corresponding to the at least one attribute dimension in the one of the rating region tables.

8. The method of claim 1, wherein at least two of the plurality of local rating region tables for the plurality of channels comprise different specific sets of content attributes corresponding to the channel and different specific sets of ratings of corresponding attributes.

9. The apparatus of claim 5, wherein at least two of the plurality of local rating region tables for the plurality of channels comprise different specific sets of content attributes corresponding to the channel and different specific sets of ratings of corresponding attributes.

10. The method of claim 1, wherein the plurality of local RRTs comprises at least three RRTs.

11. The apparatus of claim 5, wherein the plurality of local RRTs comprises at least three RRTs.

* * * * *